Patented June 27, 1933

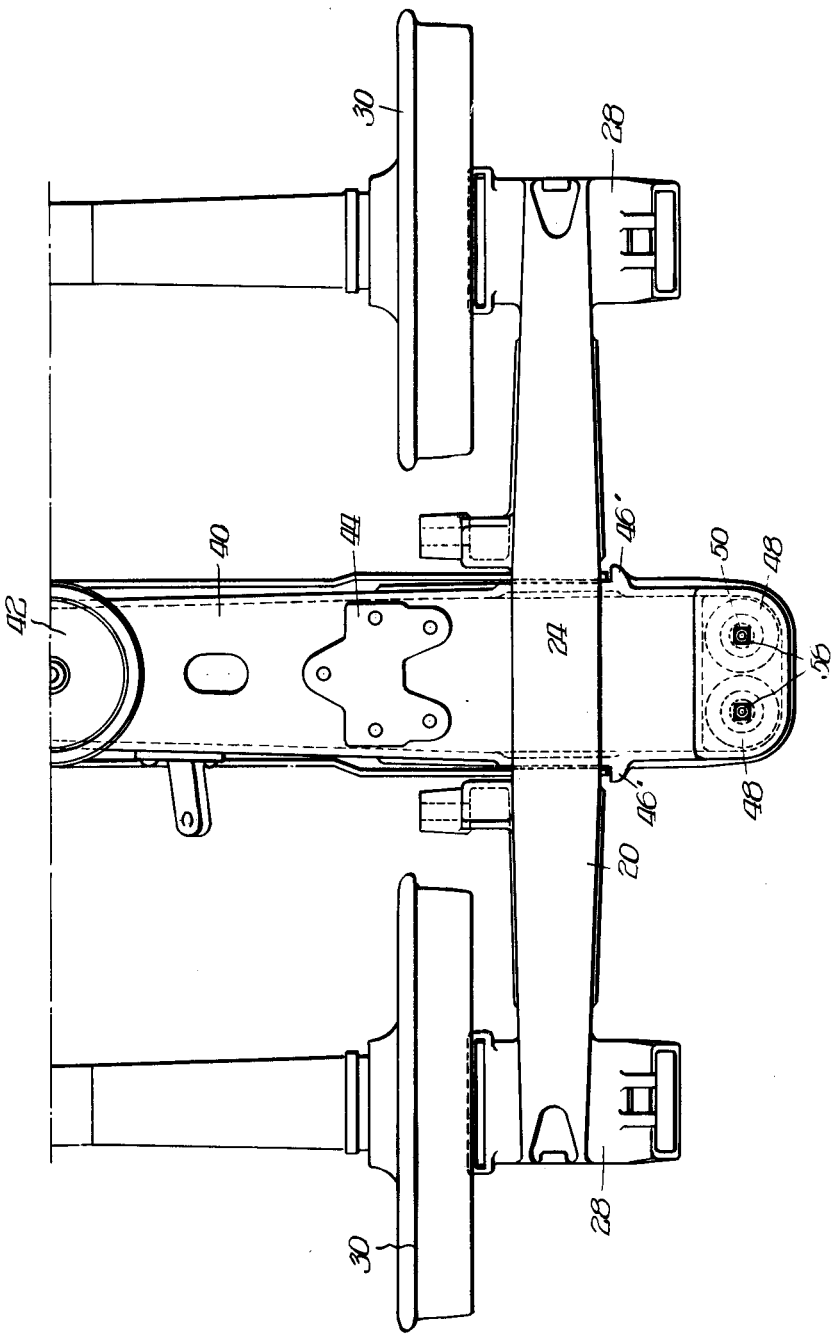

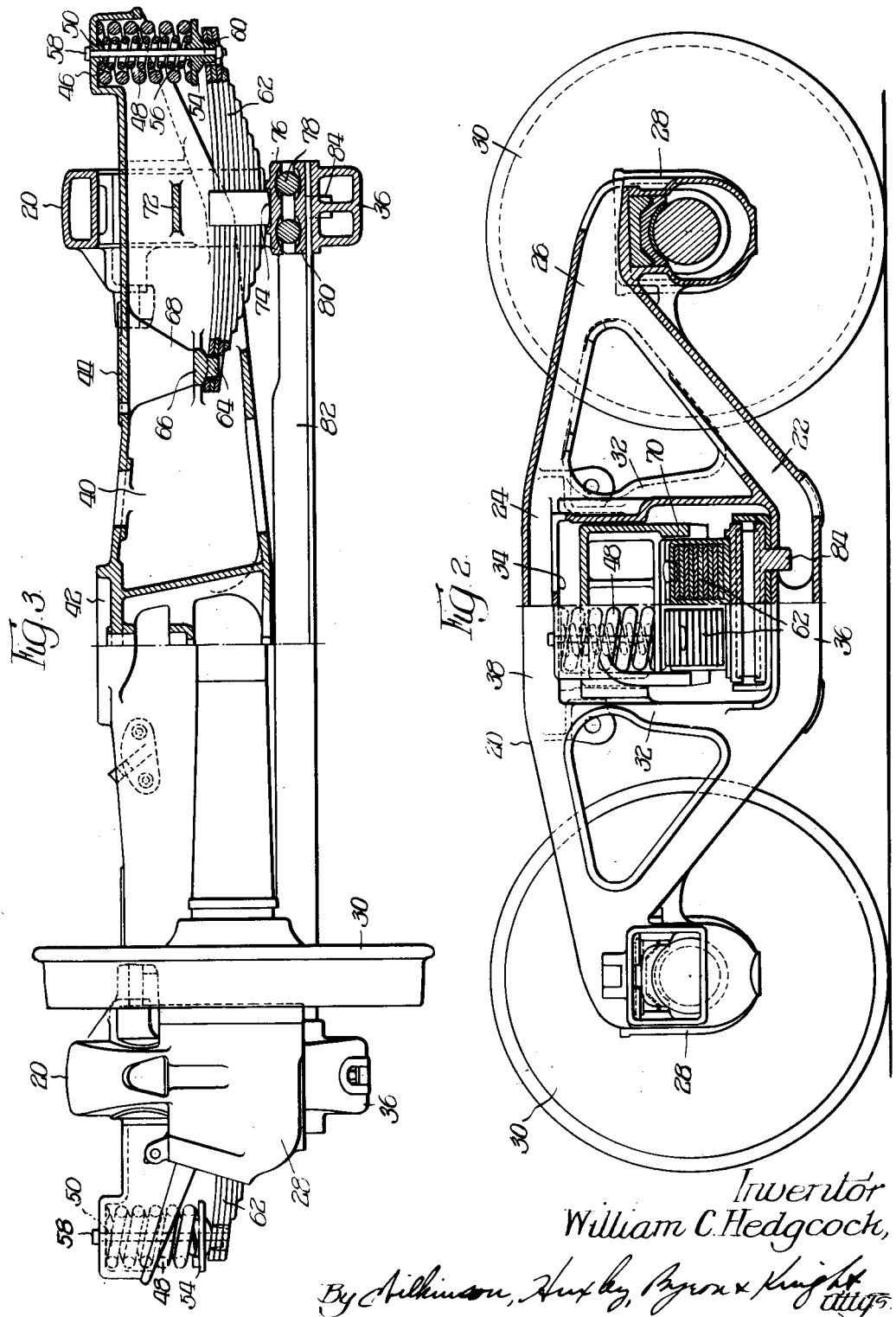

1,916,147

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,490.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to trucks parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes to stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each others synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the others vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

A still different object is to provide a truck having the above objects, but one adapted to conditions wherein vertical clearances are limited.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction embodying the invention;

Figure 2 is a side elevation partly in section of the truck construction illustrated in Figure 1;

Figure 3 is a transverse elevation partly in section of a truck construction embodying the invention, the section being taken substantially on the transverse center line of the truck.

In the form of truck such as illustrated where vertical clearance conditions are limited, the side frame 20 is preferably of truss construction and includes the tension member 22 and the compression member 24, said members merging adjacent their ends as at 26, being provided with the journal boxes 28, which, while shown of the conventional A. R. A. type, may be of any preferable construction and cooperate with the journal ends of the wheel and axle assemblies 30, which may also be of any preferred type. The side frame is provided with the integral connecting column guides 32 forming a window or bolster opening 34 with the upper and lower arch bars 36 and 38, the columns being widened adjacent the lower arch bar for facilitating assembly of the bolster 40.

The bolster 40 is provided with the center and side bearings 42 and 44, and is provided with the lugs 46' cooperating with the column guides for positioning the bolster in respect to the side frames but permitting vertical sliding movement of the bolster in the bolster opening. The outer end of the bolster is provided with the coil spring seat 46 in which is mounted the coil spring assembly 48, said coil spring assembly being positioned by means of the depending dowel 50. The coil spring assembly may be of any preferred construction such as constant pitch, variable pitch, variable sectional area, or variable stiffness, or of any form such as shown in application Serial No. 552,153, filed July 21, 1931.

The lower spring cap 54 is provided with the upwardly extending dowel 56 for positioning the coil spring assembly, and assembly of the spring cap, bolster, and coil springs may be facilitated by means of the bolt 58. The spring cap 54 is provided with the depending positioning dowel 60 adapted to be received in a suitable aperture formed in the outer leg of the leaf spring assembly 62. The inner end of the leaf spring assembly is positioned by means of the depending dowel 64 provided on the spring seat 66. The spring seat 66 is provided within the bolster and preferably below the side bearings 44, suitable reenforcing ribs 68 providing the necessary strength.

The bolster through the center portion thereof is preferably of box section from side bearing to side bearing, and outwardly thereof is preferably of U-shaped construction, having an upper web with depending flanges reenforced at the bottom with suitable beads 70 partially embracing the leaf spring assembly 62 which fits between the depending flanges. The inner end of the leaf spring, therefore, is within the box section, and a tie or brace 72 is provided between the depending flanges of the bolster and is directly above the spring band to provide proper stiffening and bracing for the flanges, and serving as a stop or seat for the spring band to prevent excessive motion of the bolster in case of a spring failure.

The spring band is seated in the seat 74 provided on the upper lateral motion cap 76, said cap being provided with seats in which lateral motion rollers 78 are mounted, the rollers seating in corresponding seats provided in the lower lateral motion member 80 seated on the spring plank 82 and positioned on the lower arch bar by means of the depending dowel 84. The spring plank 82 serves to tie the side frames together and maintain them in squared relation to each other. Rubber or other resilient pads may be provided between the springs and/or truck parts to deaden noise.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a car truck, the combination of side frames each including tension and compression members, spaced integrally connecting column guides forming a bolster opening, a spring plank extending into said openings and connected to the lower arch bars of said tension members for connecting said frames, a bolster extending through said openings, said bolster having a center bearing and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, lateral motion means disposed on said spring plank substantially in the plane of said side frames, semi-elliptic leaf springs seated on said lateral motion means and engaging said first named seats, and coil springs interposed between the outer ends of said leaf springs and seated on said coil spring seats.

2. In a car truck, the combination of side frames, a spring plank connecting said side frames, a bolster having center and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, lateral motion means disposed on said spring plank, semi-elliptic leaf springs seated on said lateral motion means and engaging said first named seats, and coil springs interposed between the outer ends of said leaf springs and seated on said coil spring seats.

3. In a car truck, the combination of side frames, a spring plank connecting said side frames, a bolster having center and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, lateral motion means disposed on said spring plank substantially in the plane of said side frames, semi-elliptic leaf springs seated on said lateral motion means and engaging said first named seats, and coil springs interposed between the outer ends of said leaf springs and seated on said coil spring seats.

4. In a car truck, the combination of side frames each including tension and compression members, spaced integrally connecting column guides forming a bolster opening, a spring plank extending into said openings and connected to the lower arch bars of said tension members for connecting said frames, a bolster extending through said openings, said bolster having a center bearing and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, lateral motion means disposed on said spring plank, semi-elliptic leaf springs seated on said lateral motion means and engaging said first named seats, and coil springs interposed between the outer ends of said leaf springs and seated on said coil spring seats.

5. In a car truck, the combination of side frames, a spring plank connecting said side frames, a bolster having center and spaced side bearings, said bolster having a substantial box section for a portion of the length thereof, spring seats formed on the inside of said bolster, coil spring seats formed on the ends of said bolster outwardly of said side frames, lateral motion means disposed on said spring plank substantially in the plane of said side frames, semi-elliptic leaf springs seated on said lateral motion means and engaging said first named seats, and coil springs interposed between the outer ends of said leaf springs and seated on said coil spring seats.

6. In a car truck, the combination of side frames, a spring plank connecting said side frames, a bolster having center and spaced side bearings, said bolster having a substantial box section for a portion of the length thereof, spring seats formed on the inside of said bolster, coil spring seats formed on the ends of said bolster outwardly of said side frames, lateral motion means disposed on said spring plank, semi-elliptic leaf springs seated on said lateral motion means and engaging said first named seats, and coil springs interposed between the outer ends of said leaf springs and seated on said coil spring seats.

7. In a car truck, the combination of side frames each including tension and compression members, spaced integrally connecting column guides forming a bolster opening, a spring plank extending into said openings and connected to the lower arch bars of said tension members for connecting said frames, a bolster extending through said openings, said bolster having a center bearing and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, a spring seat disposed on said spring plank in the plane of said side frames, semi-elliptic leaf springs disposed on said last named spring seat, and coil springs interposed between the outer ends of said leaf springs and seated on said coil spring seats.

8. In a car truck, the combination of side frames each including tension and compression members, spaced integrally connecting column guides forming a bolster opening, a spring plank extending into said openings and connected to the lower arch bars of said tension members for connecting said frames, a bolster extending through said openings, said bolster having a center bearing and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, semi-elliptic leaf springs disposed on said spring blank, and coil springs interposed between the outer ends of said leaf springs and seated on said coil spring seats.

9. In a car truck, the combination of side frames, a spring plank connecting said side frames, a bolster having center and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, a spring seat disposed on said spring plank in the plane of said side frames, semi-elliptic leaf springs disposed on said last named spring seat, and coil springs interposed between the outer ends of said leaf springs and seated on said coil spring seats.

10. In a car truck, the combination of side frames, a spring plank connecting said side frames, a bolster having center and spaced side bearings, said bolster having a substantial box section between said side bearings and being of substantially inverted U-section outwardly thereof, spring seats formed in said box section substantially in the plane of said side bearings, coil spring seats formed on the ends of said bolster outwardly of said side frames, semi-elliptic leaf springs disposed on said spring plank, and coil springs interposed between the outer ends of said leaf springs and seated on said coil spring seats.

11. In a car truck, the combination of side frames, a spring plank connecting said side frames, a bolster having center and spaced side bearings, said bolster having a substantial box section for a portion of the length thereof, spring seats formed on the inside of said bolster, coil spring seats formed on the ends of said bolster outwardly of said side frames, semi-elliptic leaf springs disposed on said spring plank, and coil springs interposed between the outer ends of said leaf springs and seated on said coil spring seats.

12. In a car truck, the combination of side frames, a spring plank connecting said side frames, a bolster having center and spaced side bearings, said bolster having a substantial box section for a portion of the length thereof, spring seats formed on the inside of said bolster, coil spring seats formed on the ends of said bolster outwardly of said side frames, a spring seat disposed on said spring plank in the planes of said side frames, semi-elliptic leaf springs disposed on said last named spring seat, and coil springs interposed between the outer ends of said leaf springs and seated on said coil spring seats.

13. A bolster having a center bearing and spaced side bearings, said bolster having a substantial box section between said side bearings and being of substantially inverted U-section outwardly to the ends thereof, spring seats formed in said box section substantially in the plane of said side bearings, and spring seats formed on the ends of said bolster in said U-section.

14. A bolster having a center bearing and spaced side bearings, said bolster having a substantial box section between said side bearings and being of substantially inverted U-section outwardly to the ends thereof, spring seats formed in said box section substantially in the plane of said side bearings, and coil spring seats formed on the ends of said bolster in said U-section.

15. A bolster having a center bearing and spaced side bearings, said bolster having a substantial box section between said side bearings and being of substantially inverted U-section outwardly to the ends thereof, leaf spring seats formed in said box section substantially in the plane of said side bearings, and spring seats formed on the ends of said bolster in said U-section.

16. A bolster having a center bearing and spaced side bearings, said bolster having a substantial box section between said side bearings and being of substantially inverted U-section outwardly to the ends thereof, leaf spring seats formed in said box section substantially in the plane of said side bearings, and coil spring seats formed on the ends of said bolster in said U-section.

17. A bolster having a center bearing and spaced side bearings, said bolster having a substantial box section between said side bearings and being of substantially inverted U-section outwardly to the ends thereof, spring seats formed in said box section substantially in vertical alignment with said side bearings, and spring seats formed on the ends of said bolster in said U-section and spaced from said side bearings.

18. A bolster having a center bearing and spaced side bearings, said bolster having a substantial box section between said side bearings and being of substantially inverted U-section outwardly to the ends thereof, spring seats formed in said box section substantially in vertical alignment with said side bearings, and coil spring seats formed on the ends of said bolster in said U-section.

19. A bolster having a center bearing and spaced side bearings, said bolster having a substantial box section between said side bearings and being of substantially inverted U-section outwardly to the ends thereof, leaf spring seats formed in said box section substantially in vertical alignment with said side bearings, and spring seats formed on the ends of said bolster in said U-section and spaced from said side bearings.

20. A bolster having a center bearing and spaced side bearings, said bolster having a substantial box section between said side bearings and being of substantially inverted U-section outwardly to the ends thereof, leaf spring seats formed in said box section substantially in vertical alignment with said side bearings, and coil spring seats formed on the ends of said bolster in said U-section.

21. A bolster having a center bearing and spaced side bearings, said bolster having a substantial box section between said side bearings and being of substantially inverted U-section outwardly thereof, spring seats formed in said box section, and spring seats formed on the ends of said bolster, and reenforcing means extending from one of said seats to said side bearings.

22. A bolster having a center bearing and spaced side bearings, spring seats formed within said bolster and substantially in the plane of said side bearings, and spring seats formed within the ends of said bolster.

23. A bolster having a center bearing and spaced side bearings, leaf spring seats formed within said bolster and substantially in the plane of said side bearings, and spring seats formed within the ends of said bolster.

24. A bolster having a center bearing and spaced side bearings, leaf spring seats formed within said bolster and substantially in the vertical plane of said side bearings, and coil spring seats formed within the ends of said bolster.

25. A bolster having a center bearing, spaced side bearings and column cooperating portions, said bolster having a substantial box section between said side bearings and being of substantially inverted U-section outwardly to the ends thereof, spring seats formed in said box section substantially in vertical alignment with said side bearings, and spring seats formed on the ends of said bolster in said U-section.

26. A bolster having a center bearing, spaced side bearings and column cooperating portions, leaf spring seats formed within said bolster substantially in vertical alignment with said side bearings, and spring seats formed on the ends of said bolster and substantially in alignment with said first named seats and in a plane parallel to the longitudinal center line of said bolster.

27. A bolster having a center bearing, spaced side bearings and column cooperating portions, leaf spring seats formed within said bolster substantially in vertical alignment with said side bearings, and spring seats formed on the ends of said bolster and spaced from said side bearings and substantially in alignment with said first named seats and in a plane parallel to the longitudinal center line of said bolster.

28. In a car truck, the combination of a side frame, a load carrying member, resilient means for supporting said load carrying member on said side frame, said resilient means including a leaf and a coil spring, said load carrying member having seats for said leaf and coil springs disposed within said load carrying member, the seat for said coil spring being adjacent the end of said load carrying member, one of said seats being disposed outwardly of said side frame.

29. In a car truck, the combination of a side frame, a load carrying member, resilient means for supporting said load carrying member on said side frame, said resilient means including a leaf and a coil spring, said load carrying member having seats for said leaf and coil spring disposed within said load carrying member, the seat for said coil spring being adjacent the end of said load carrying member, one of said seats being disposed outwardly of said side frame and the other of said seats being arranged inwardly of said side frame.

30. In a car truck, the combination of a side frame, a load carrying member, resilient means for supporting said load carrying member on said side frame, said resilient means including a leaf and a coil spring, said load carrying member having seats for said leaf and coil springs disposed within said load carrying member, one of said seats being adjacent the end of said load carrying member and disposed outwardly of said side frame.

31. In a car truck, the combination of a side frame, a load carrying member, resilient means for supporting said load carrying member on said side frame, said resilient means including a leaf and a coil spring, said load carrying member having seats for said leaf and coil springs disposed within said load carrying member, one of said seats being adjacent the end of said load carrying member and disposed outwardly of said side frame, and the other of said seats being arranged inwardly of said side frame.

32. In a car truck, the combination of a side frame and a bolster, said bolster being provided with center and side bearings and being substantially box sectioned between said bearings, a coil spring, a leaf spring having three points of connection, one point connecting the leaf spring to said bolster substantially within said box section and substantially in vertical alignment with one of said side bearings, a second point connecting the leaf spring to the side frame and the third point connecting said leaf spring to said bolster through said coil spring said second point being intermediate the ends of said leaf spring.

33. In a car truck, the combination of a side frame and a bolster, said bolster being provided with center and side bearings and being substantially box sectioned between said bearings, a coil spring, a leaf spring fixed against body movement with respect to said side frame, said leaf spring having three points of connection, one point connecting the leaf spring to said bolster substantially within said box section and substantially in vertical alignment with one of said side bearings, a second point connecting the leaf spring to the side frame and the third point connecting said leaf spring to said bolster through said coil spring, said second point being intermediate the ends of said leaf spring.

34. In a car truck, the combination of spaced side frames, a spring plank connecting said side frames, a bolster having center and side bearings, said bolster being substantially of box section between said side bearings, a leaf spring mounted on said spring plank whereby it is carried by said side frame, a coil spring interposed directly between an end of said leaf spring and said bolster, the other end of said leaf spring being connected to said bolster substantially within said box section.

35. In a car truck, the combination of a side frame, lateral roller means carried thereby, a bolster having center and side bearings, said bolster being substantially of box section between said side bearings, and a spring mounted on said lateral motion roller means and supporting said bolster partly directly and partly through another spring, the direct support being substantially within said box section.

36. In a car truck, the combination of a side frame, the bolster having center and side bearings, said bolster being substantially of box section between said side bearings, a friction assembly carried by said side frame and supporting said bolster through a non-resilient connection at one point substantially within said box section and through a coil spring at another point, said points of support being on said bolster and above said friction assembly.

37. In a car truck, the combination of a side frame and a load carrying member, said load carrying member being substantially of box section at a portion of the length thereof, a leaf spring carried by said side frame and mounted on lateral motion means disposed on said side frame whereby said load carrying member may move laterally with respect thereto and a coil spring interposed between an end of said leaf spring and said load carrying member, the other end of said leaf spring supportingly engaging said load carrying member within the box section thereof.

38. A bolster having tension and compression members and spaced members connecting said tension and compression members adjacent the edges thereof, center and side bearings formed on said compression member, a spring seat formed on said compression member adjacent the ends thereof and a seat disposed in substantially vertical alignment with one of said side bearings and spaced from said tension and compression members.

39. A bolster including tension and compression members and spaced integrally connecting side members, said compression member being provided with a center bearing and side bearings, coil spring seats disposed substantially at the ends of said compression member, and leaf spring seats disposed substantially in a vertical plane with said coil spring seats and substantially in alignment with said side bearings, said vertical plane being parallel to the longitudinal axis of said bolster.

40. A bolster including tension and compression members and spaced integrally connecting side members, said compression member being provided with center and side bearings, said compression member having spring seats disposed thereon adjacent the ends thereof, and spring seats spaced from said tension and compression members and substantially in vertical alignment with said side bearings.

41. A bolster including tension and compression members and spaced integrally connecting side members, said compression member being provided with center and side bearings, said compression member having spring seats disposed thereon adjacent the ends thereof, and spring seats spaced from said tension and compression members and substantially in vertical alignment with said side bearings and in substantial alignment with said first named seats.

42. A bolster including tension and compression members and spaced integrally connecting side members, said compression member being provided with center and side bearings, said compression member having spring seats disposed thereon adjacent the ends thereof, and spring seats formed within said bolster and substantially in vertical alignment with said side bearings.

43. A bolster including tension and compression members and spaced integrally connecting side members, said compression member being provided with center and side bearings, said compression member having coil spring seats disposed thereon adjacent the ends thereof, and spring seats formed within said bolster and substantially in vertical alignment with said side bearings.

44. A bolster including tension and compression members and spaced integrally connecting side members, said compression member being provided with center and side bearings, said compression member having spring seats disposed thereon adjacent the ends thereof, and leaf spring seats formed within said bolster and substantially in vertical alignment with said side bearings.

Signed at Chicago, Illinois, this 23rd day of September, 1931.

WILLIAM C. HEDGCOCK.